United States Patent Office 2,908,325
Patented Oct. 13, 1959

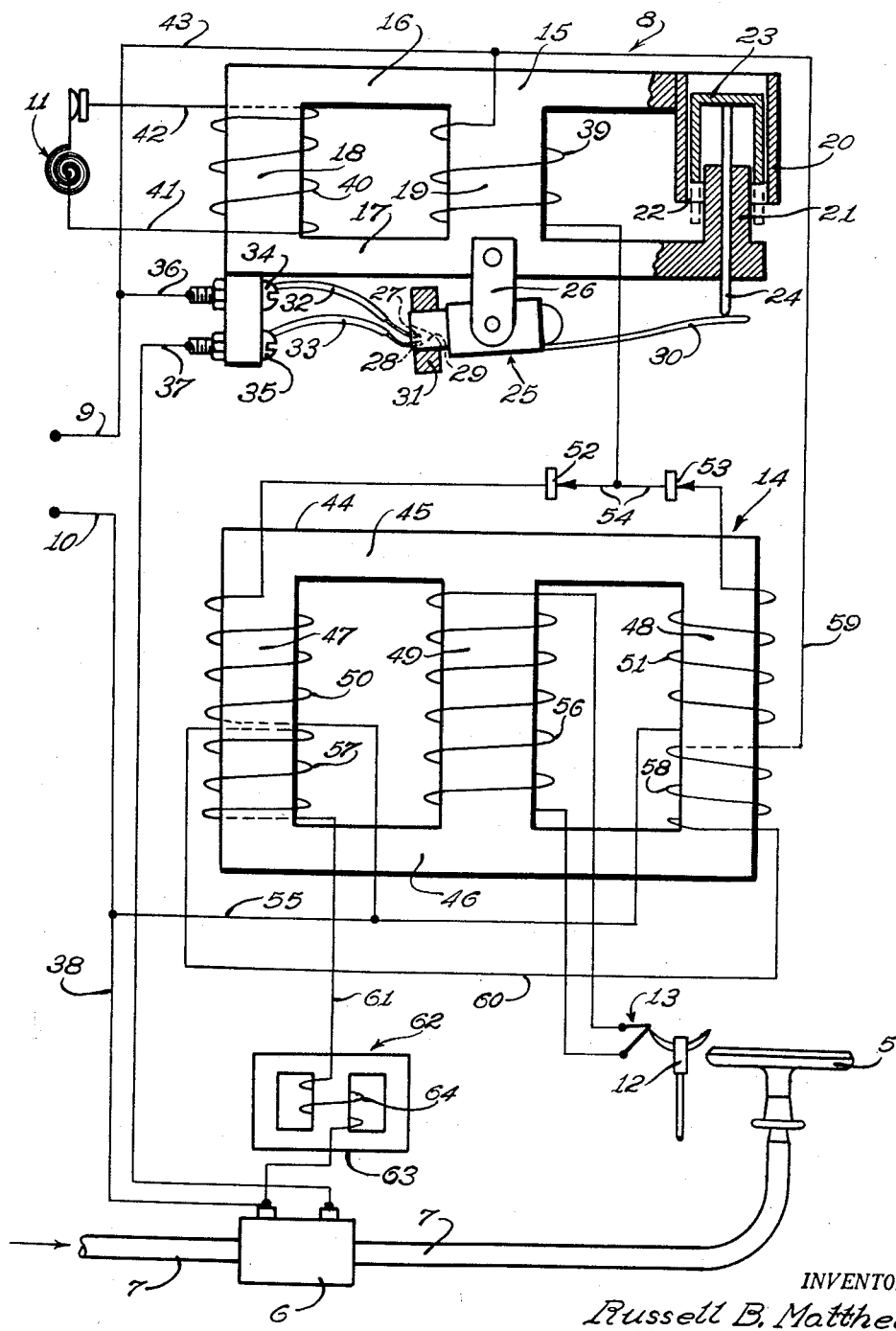

2,908,325

CONTROL APPARATUS

Russell B. Matthews, Wauwatosa, Wis., assignor to Baso Inc., Milwaukee, Wis., a corporation of Wisconsin Application October 27, 1954, Serial No. 464,922

14 Claims. (Cl. 158—123)

This invention relates to improvements in control apparatus, and more particularly to apparatus wherein a line-powered device is controlled by a small electric current, for example by a thermoelectric current.

It is a general object of the present invention to provide an improved control apparatus which affords control of a line-powered device by current from a thermoelectric generator, said apparatus including a magnetic amplifier.

Another object of the invention is to provide an improved control apparatus of the character described wherein the operation of the magnetic amplifier is independent of the electrical characteristics of the line-powered device, thereby affording free interchangeability of line-powered control devices in said apparatus regardless of the electrical characteristics of said control devices.

Another object of the invention is to provide an improved control apparatus of the aforementioned character wherein the current capacity of the magnetic amplifier is substantially increased by novel alternating current negative biasing means.

A more specific object of the invention is to provide an improved control apparatus of the class described wherein the magnetic amplifier is provided with a pair of load windings and with rectifier means affording alternate energization of said load windings during alternate half cycles of the alternating line current, there being a negative bias winding for each load winding, said bias windings being connected to the alternating current line and so phased that during the half cycles of the alternating line current that a given load winding is not energized, the bias winding for said load winding generates a flux which flows in the direction opposite to the direction of flow of the flux generated by said load winding when the latter is energized during the alternate half cycles of the line current.

Another object of the invention is to provide an improved control apparatus of the class described having means for maintaining the current flow through the load windings within predetermined limits in spite of substantial fluctuations in line voltage tending to substantially vary said current flow, wherefore the response of the control device to cooling of the generator is maintained within predetermined time limits.

More specifically it is an object of the invention to provide the aforementioned current limiting means in the form of a small, relatively inexpensive iron cored inductance in the negative bias circuit, the magnetic characteristics of the core of said inductance being such that said inductance affords a non-linear impedance which increases the negative bias in a non-proprotional manner with respect to increases in line voltage, thereby restricting the amount of current which can flow through the control windings within predetermined limits.

Another object of the invention is to provide an improved control apparatus of the aforementioned character which includes a transformer type relay which is electrically matched with and connected to the magnetic amplifier, said relay having contacts in circuit with the control device for controlling the flow of line power thereto, said relay also having a primary winding in circuit with the magnetic amplifier load windings, and a low voltage flux-diverting secondary winding which, when short circuited, effects actuation of said relay contacts when said primary winding is energized.

Another object of the invention is to provide, in an apparatus of the class described, condition responsive, for example temperature responsive, means for short circuiting the secondary winding of the relay and actuating the contacts thereof.

Other and further objects of the invention will become apparent as the description proceeds, reference being had to the accompanying drawing illustrating one complete embodiment of the invention.

In the drawing, the sole figure is a semi-diagrammatic view illustrating the use of the improved control apparatus for the control of fuel flow to a fluid fuel burner.

Referring more particularly to the drawing, the numeral 5 indicates a main burner which is supplied with fluid fuel from a suitable source by a fuel supply line 7 having an electroresponsive or automatic line-powered control valve 6, for example a solenoid valve, interposed therein for control of said fuel flow. The valve 6 is under the control of an electroresponsive control means which in the illustrated embodiment takes the form of an electroresponsive switch or transformer type relay 8 having contacts 27 and 28, to be described hereinafter, which contacts are connected in series with the valve 6. The serially connected valve 6 and contacts 27 and 28 are connected across an alternating current line comprising conductors 9 and 10. As will more clearly appear hereinafter, the relay 8 is under the control of a thermostat 11, and is also under the control of the flame of a pilot burner 12 in coacting relation with the main burner 5. Control of the relay by the pilot burner 12 is afforded by a thermocouple 13 subject to the heat of the flame of said pilot burner and connected in circuit with a variable impedance control means comprising a magnetic amplifier or saturable reactor 14, the latter also being connected in circuit with said relay as will hereinafter more clearly appear.

While the relay 8 may take a variety of forms within the concept of the invention, the preferred relay comprises a core 15 of magnetically permeable material having elongated side legs 16 and 17 and spaced transverse legs 18 and 19. The leg 15 projects beyond the transverse leg 19 and terminates in a permeable sleeve 20 extending transversely. The leg 17 also extends beyond the leg 19 and terminates in a transverse sleeve 21 of smaller diameter than the sleeve 20 and projecting coaxially thereinto as shown, to afford an annular air gap 22 between said sleeves. A non-magnetic and electrical conducting sleeve 23 is positioned within the air gap 22 for axial movement therein, and said sleeve is carried by a stem 24 which is axially slidable within the sleeve 21 and projects from the core 15 as shown.

A mercury switch 25 is pivotally mounted, for example on a bracket 26 carried by the core 15, and the contacts 27 and 28 thereof are engaged by a pool of mercury 29 to complete an electrical circuit therebetween when the switch 25 is tilted to the position shown. The switch 25 carries an arm 30 which abuts the lower end of the stem 24 as shown, and said switch may carry a weight in the form of annular ring 31 for biasing said switch to the position shown when the sleeve 23 is in the raised position shown. Downward movement of the sleeve 23, of course, tilts the mercury switch 25 in a clockwise direction to move the mercury pool 29 out of engagement with the electrical contacts 27 and 28 and to thereby open the circuit therebetween.

The contacts 27 and 28 of the switch 25 are provided with a pair of flexible leads 32 and 33 respectively for connection to a pair of terminals 34 and 35. A conductor 36 connects the terminal 34 in circuit with the line conductor 9, and a conductor 37 connects the terminal 35 in circuit with one terminal of the valve 6. A conductor 38 connects the other terminal of the valve 6 in circuit with the line conductor 10.

The relay 8 is provided with a primary winding 39 on the core arm 19 and a secondary winding 40 on the transverse core arm 18 as shown. A pair of conductors 41 and 42 connects the ends of the secondary winding 40 in circuit with the contacts of a condition responsive circuit-controlling device, for example the thermostat 11, which is operable to short-circuit said secondary winding when the contacts thereof are closed. The secondary winding 40 has a relatively small number of turns as compared with the winding 39, and therefore a relatively low voltage is generated therein, for example on the order of 24 volts. This low voltage permits the use of relatively light insulation on the conductors 41 and 42.

When the primary coil 39 of the relay 8 is deenergized, there is, of course, no flux flow through the core 15. At the same time the sleeve 23 is biased by gravity to its lowered, dotted line position. Movement of the sleeve 23 to its lowered position tilts the mercury switch 25 in a clockwise direction to move the mercury pool 29 away from the contacts 27 and 28, thereby interrupting the line current flow to the valve 6, so that said valve closes and shuts off the fuel flow to the burner 5. When the primary winding 39 of the relay 8 is energized, however, flux is caused to flow in the core 15. If the contacts of the thermostat 11 are open, the flux generated by the energization of the primary winding 39 flows in the closed path provided by the core side legs 16 and 17 and the transverse core legs 18 and 19. When this condition obtains, the sleeve 23 remains in the lowered or dotted line position.

When the thermostat 11 calls for heat, however, and closes its contacts to short circuit the secondary winding 40, a current is induced in said winding 40 which generates magnetic flux which opposes the flow through the core arm 18 of flux generated by the primary winding 39. As a result, the flux generated by the primary winding 39 is diverted away from the transverse core arm 18 and across the air gap 22. Flux flow across the annular air gap 22 causes a current to be induced in the sleeve 23, said current generating magnetic flux which reacts with the flux flowing across the air gap in a manner to cause the sleeve 23 to tend to be repelled from said air gap. This repulsion causes said sleeve 23 to be raised from the dotted line position to the solid line position. As the sleeve 23 and its stem 24 are thus raised, the switch 25 is allowed to tilt to the position shown under the bias of the weight 31. This, of course, closes the circuit to the valve 6 and opens the latter to permit fuel flow to the burner 5.

Subsequent opening of the thermostat contacts interrupts the current induced in the relay secondary winding 40, and thereby dissipates the field generated by said induced current, thus permitting the flux from the primary coil 39 to again flow through the core arm 18 rather than across the air gap 22. With no flux flow across the air gap 22, the sleeve 23 returns by gravity to the dotted line position, and the switch 25 is thereby tilted to circuit interrupting position (not shown), thereby closing the valve 6 and shutting off the fuel flow to the burner 5.

In order to afford energization of the primary relay winding 39, a conductor 43 connects one end of said winding in circuit with the line conductor 9. Current flow through the relay winding 39 is controlled by the magnetic amplifier 14 which comprises a magnetically permeable core having elongated side legs 45 and 46, transverse end legs 47 and 48, and a central transverse leg 49. A load winding 50 is wound on the transverse core leg 47, and a load winding 51 is wound on the transverse core leg 48 in the opposite direction from that of the load winding 50 as shown. One end of the load winding 50 is connected in circuit with a unidirectional impedance in the form of a rectifier 52, and one end of the load winding 51 is connected in circuit with a unidirectional impedance in the form of a rectifier 53. A conductor 54 connects the rectifiers 52 and 53 to the other end of the primary relay winding 39 as shown. The other ends of the load windings 50 and 51 are connected to each other and are connected in circuit with the line conductor 10 by a conductor 55. The rectifiers 52 and 53 are so connected that during one-half of the alternating current cycle current flows through the rectifier 52 and the load winding 50, said current generating a flux in the core 44 which flows in a downwardly direction through the core leg 47. During the other half of the alternating current cycle current flows through the load winding 51 and rectifier 53 in a direction to generate a flux flow in the core 45 which flows downwardly in the core arm 48.

A control winding 56 having a relatively large number of turns as compared with the load windings 50 and 51, is wound on the central core leg 49. The ends of the control winding are connected in circuit with the terminals of the thermoelectric generator 13 as shown, the polarity of the generator 13 and the direction of the winding 56 being such that current from the generator 13 flowing through the winding 56 generates a flux in the core arm 49 which flows upwardly therein. It is apparent, therefore, that the flux flow generated by the control winding 56 aids the flux flow generated by the load windings 50 and 51.

With the apparatus connected to the line in the manner described, heating of the generator 13 by the flame of the pilot burner 12, causes said generator to produce sufficient voltage to effect saturation of the core 44, whereupon current is permitted to flow through the load windings and the relay coil 39 in sufficient quantity to hold the sleeve 23 in the raised position shown when the thermostat contacts are closed. The valve 6 can now be cycled by response of the thermostat 11 to fluctuations in the temperature sensed thereby. On outtage of the pilot burner 12, however, the generator 13 cools and the control winding 56 becomes deenergized. This unsaturates the core 45, and as a result, the current flow through the load windings, and hence the relay winding 39, is reduced to below that necessary to maintain the sleeve 23 in raised position. The sleeve 23 is thereupon biased by gravity to its lowered position, and the switch 25 is thereby tilted to circuit-interrupting position (not shown) to cause closure of the valve 6 and shut-off of the flow of fuel to the burner 5.

Novel means is provided for increasing the output of the magnetic amplifier for a given core size, i.e. providing greater power amplification. The aforementioned means takes the form of alternating current negative biasing means, more specifically windings 57 and 58 wound respectively on the transverse core legs 47 and 48. The winding 57 is wound in the same direction as the load winding 50, and the winding 58 is wound in the same direction as the load winding 51. A conductor 59 connects the upper end of the winding 58 in circuit with the line conductor 9, and a conductor 60 connects the lower end of the winding 58 in circuit with the upper end of the winding 57. A conductor 61 connects the lower end of the winding 57 in circuit with the line conductor 10 through a coil 64 to be described hereinafter and the conductor 38. It is apparent, therefore, that the windings 57 and 58 are connected in series with each other across the alternating current line.

The direction in which windings 57 and 58 are wound respectively on core legs 47 and 48 and the connections made thereto are dependent upon the direction in which the respective load windings 50 and 51 are wound on their respective core legs and the connections made thereto including placement of rectifiers 52 and 53. That is, the bias windings must be so phased with respect to the load windings that during the half cycles of the alternating line current in which a given load winding is not energized, the bias winding for that load winding generates a flux which flows in the direction opposite to the direction of flow of the flux generated by said load winding when the latter is energized during the alternate half cycles of the line current.

Such arrangement of bias windings 57 and 58 with respect to the load windings 50 and 51 causes the bias windings to change the flux density of the saturable reactor core to a point well below zero flux density along the saturation curve whenever the respective load windings are not energized. Thus, when the respective load winding subsequently is energized by current flow therethrough, a greater change in flux density in the iron core takes place since such load winding causes the density to go from its bias point through zero value to its maximum density in the other direction. It is thus seen that this novel construction provides increased power amplification by virtue of the fact that said structure permits an increased voltage alternating current source to be used to effect increased current flow through the load windings and the relay 8 when the control winding is energized, without a corresponding increase in the current flow through said load windings when the control winding is deenergized. Thus, the presence or absence of the small amount of current which can be supplied by the thermoelectric generator 13 to the control winding can be utilized to control the supply of greater values of current to the relay 8 than would be possible by the magnetic amplifier 14 if the novel alternating current biasing means were absent therefrom.

Because of operational safety considerations, the time lag between outtage of the flame of the pilot burner 12 and closure of the automatic valve 6 must be kept within predetermined limits. The line voltage, however, may fluctuate as much as 30 volts, for example between 97 and 127 volts. This fluctuation in line voltage effects a similar but non-linear fluctuation in the amount of current flowing through the load windings and relay coil 39. An increase in the current flow through the load windings 50 and 51 is reflected in a substantial increase in the drop-out time, i.e. the time lag between outtage of the pilot burner flame and closure of the automatic valve 6. This is true because when the higher voltage condition obtains, a smaller voltage is required from the thermoelectric generator 13 in order to effect saturation of the core 44. With this smaller voltage requirement in the control winding, the generator 13 can cool for a longer period before the voltage generated thereby is insufficient to maintain the core saturated. This, of course, increases the drop-out time.

In order to maintain the aforementioned drop-out time within predetermined safe limits regardless of line voltage fluctuations, means is provided for maintaining the current flow through the load windings 50 and 51 within predetermined limits regardless of fluctuations in line voltage. This current limiting function is provided by a compensating reactor 62 which takes the form of a small iron cored inductance. The reactor 62 has a three limbed core 63, around the center limb of which the coil 64 is wound. As indicated previously, the coil 64 is interposed in the conductor 61, and is thereby in series with the negative bias windings 57 and 58. The cross-section of the core 63 is so designed that when the line voltage is at the lower end of its fluctuating range, the flux density in said core is just below the knee of the saturation curve of said core and presents a relative high impedance to the flow of current through the bias windings 57 and 58, thereby providing just the correct amount of negative bias current for maximum sensitivity. As the line voltage increases, however, the flux density of the core 63 increases, moving across the knee of said saturation curve to partially saturate the core. The impedance is thereby decreased in a non-linear manner, and since the reactor winding 64 is in series with the bias windings 57 and 58, the non-linear decrease in impedance increases the negative bias afforded by the coils 57 and 58 in a non-linear fashion as the line voltage increases, the negative bias afforded being a function of the current flow through the bias windings 57 and 58 permitted by the reactor 62. The aforementioned increase in the negative bias holds the current flow through the load windings 50 and 51, and hence through the relay winding 39 within predetermined limits regardless of line voltage fluctuations.

To illustrate the effectiveness of the reactor 62 in compensating for line voltage fluctuations, one form of the improved control apparatus when tested without the reactor 62 has a drop-out time of 35 seconds when the line voltage is 98 volts, and has a drop-out time of 4.5 minutes when the line voltage is 127 volts. When the reactor 62 is used, the same apparatus has a drop-out time of 40 seconds when the line voltage is 98 volts and a drop-out time of 80 seconds when the line voltage is 127 volts. A drop-out time of 80 seconds is well within safe operating limits.

The reactor 62 in series with the coils 57 and 58 provides a simple and inexpensive means for compensating for substantial fluctuations in line voltage. The operation of the reactor 62 along the most non-linear portion, i.e. the knee portion, of its saturation curve when the line voltage is within its normal range, affords a match for the operation of the magnetic amplifier 14 along a similar non-linear portion of its saturation curve for the same line voltages. It also affords a match for the output voltage vs. temperature cooling curve of the thermoelectric generator, which curve is non-linear in nature. No linear type compensating means, for example a resistance, could provide satisfactory compensation for these non-linear values to afford the apparatus a satisfactory drop-out time range for normal voltage fluctuations.

In summation, the operation of the device shown in the drawing is as follows:

With conductors 9 and 10 connected to a source of alternating current, and with pilot burner 12 connected to a source of fluid fuel supply, the first step in placing the fuel burning apparatus in operation is to ignite the fuel emitted by said pilot burner 12. The flame of burner 12 affords heating of the hot junction of thermoelectric generator 13 which, in turn, energizes winding 56.

The aforementioned connection of conductors 9 and 10 to a source of alternating current voltage creates only a very small current flow through load windings 50 and 51 prior to energization of winding 56; so small, in fact, that insufficient current flows through primary winding 39 of relay 8 to produce a flux flow capable of lifting sleeve 23. Under such conditions, closure of thermostatic switch 11 has no effect whatever on the position of the flow control member of solenoid 6.

Energization of control winding 56, however, partially saturates core member 44, thus decreasing the electrical impedance of load windings 50 and 51 and permitting increased current to flow therethrough. Such increase in current flow through the load windings, increases the partial saturation of core member 44, said increased partial saturation permitting a further increase in current flow through the load windings, which, in turn, permits a further increase in the partial saturation of core member 44. This sequence continues until core member 44 is saturated, said saturation taking place substantially instantaneously. Under these conditions, the winding 39 of relay 8 is sufficiently energized to create a flux flow in core member 15 capable of raising sleeve 23 when made to flow across the air gap 22. As above explained, with thermostat 11 satisfied (open position), such flux is caused to circulate in legs 16, 17, 18 and 19, but as soon as thermostat 11 calls for heat (closed position), such flux is caused to traverse air gap 22, and sleeve 23 is inductively moved to its upper position.

Such movement of sleeve 23 causes mercury pool 29 to bridge contacts 27 and 28, whereupon electrical energy is supplied to solenoid 6. Energization of solenoid 6 causes the flow control member thereof to be moved to its flow-permitting position, thus permitting fluid fuel to flow to main burner 5. The fuel emitted at burner 5 is ignited by the flame of pilot burner 12, thus placing the fluid fuel burning apparatus in operation.

As long as pilot burner 12 remains ignited, sufficient current will flow to relay winding 39 to provide ample flux flow in relay core 15 to lift sleeve 23 to its upper position whenever thermostat 11 calls for heat. Conversely, of course, whenever thermostat 11 is satisfied, sleeve 23 will remain in its lower position. Thus, main burner 5 will be ignited whenever thermostat 11 calls for heat and shut off whenever thermostat 11 is satisfied, provided the pilot burner 12 remains ignited. If, however, the flame at pilot burner 12 is extinguished, accidentally or otherwise, the electrical impedance of load winding 50 and 51 will increase to such an extent that insufficient current can flow through relay winding 39 to afford enough flux flow in core 15 to lift sleeve 23 to its upper position. Thus sleeve 23 will remain in its lower position and solenoid 6 will remain in its flow-preventing position even though the thermostat 11 may be calling for heat. Thus, the subject device affords both thermostatic control and safety shut off of main burner 5.

In the improved apparatus the electrical characteristics of the relay 8 are matched to those of the magnetic amplifier 14 to provide the requisite sensitivity. No such matching is required, however, as far as the line-powered control device 6 is concerned, since said device is isolated from the electrical circuit including the relay coils and the magnetic amplifier, its only connection with the relay being with the contacts 27 and 28. Such an arrangement permits ready interchangeability of the valve 6 or other line powered device controlled by the relay 8.

The specific illustration and corresponding description are used for the purpose of disclosure only, and are not intended to impose unnecessary limitations on the claims, or to confine the patented invention to a particular use. Various changes and modifications may be made without departing from the spirit of the invention, and all of such changes and modifications are contemplated as may come within the scope of the claims.

What is claimed as the invention is:

1. Control apparatus comprising, in combination, electroresponsive control means energizable to effect a predetermined control function, a magnetic amplifier having a saturable core, a load winding in circuit with said control means and with a source of operating energy, and a control winding energizable to permit sufficient current flow from said source through said load winding and control means to effect energization of the latter, condition responsive means in circuit with said control winding for effecting energization of the latter upon occurrence of a predetermined condition, and means for maintaining the current flow through said load winding within predetermined limits in spite of substantial fluctuations in said source of operating energy tending to substantially vary said current flow, said means comprising a bias winding for said load winding, and an inductance in circuit with said bias winding and said source, said inductance affording a non-linear variable impedance which varies the bias of said bias winding in a non-proportional manner in response to fluctuations in said source of operating energy.

2. Control apparatus comprising, in combination, a magnetic core, a pair of load windings on said core connected to an alternating current source, a control winding on said core, rectifier means for causing current from said source to flow to said load windings alternatively during alternate halves of the alternating current cycle, means including a source of small direct electric current connected in circuit with said control winding for energizing the latter and saturating said core, a negative bias winding on said core for each of said load windings, said bias windings being connected in circuit with said alternating current source and wound on said core in such a manner that during the half cycle that a given load winding is deenergized the corresponding bias winding generates a flux flow in a direction opposite the flux generated by said load winding when energized, thereby permitting increased current flow through said load winding for a given cross-section of the core, a circuit-controlling device connected in circuit with said load windings and adapted to be energized by current from said alternating current source flowing through said load windings, said device having contacts actuable to controlling positions in response to energization and deenergization of said device, failure of said small current source and deenergization of said control winding rendering said core unsaturated and thereby restricting the current flow through said load windings, said restriction causing deenergization of said circuit-controlling device and actuation of said contacts, and a control device in circuit with said contacts and under the control thereof.

3. Control apparatus comprising, in combination, a magnetic core, a pair of load windings on said core connected to an alternating current source, a control winding on said core, rectifier means causing current from said source to flow to said load windings alternatively during alternate halves of the alternating current cycle, means including a source of small direct electric current connected in circuit with said control winding for energizing the latter and saturating said core, a negative bias winding on said core for each of said load windings, said bias windings being connected in circuit with said alternating current source and wound on said core in such a manner that when one of said load windings is not conducting, the corresponding bias winding generates a flux flow in a direction opposite the flux generated by said load winding when the latter is conducting, thereby permitting increased current flow through said load windings for a given core cross-section, and means for maintaining the current flow through said load coils within predetermined limits in spite of substantial fluctuations in the voltage of said alternating current source, said means comprising an inductance in circuit with said bias windings and said alternating current source and affording a non-linear impedance which varies the negative bias of said bias windings in a non-proportional manner in response to the fluctuations in the voltage of said alternating current source.

4. Control apparatus comprising, in combination, a control device having a member movable between an energized pulled-in position and a deenergized dropped-out position, a magnetic amplifier having load and control windings, said load winding being connected in circut with said control device and a source of line current, means including a thermoelectric generator subjected to a heat source and connected in circuit with said control winding for energizing the latter to permit line current flow through said control winding for energization of said control device, failure of said heat source causing gradual cooling of said generator and corresponding gradual deenergization of said control winding, said deenergization causing gradual restriction of the line current flow through said load winding and corresponding deenergization of said control device to effect drop-out of said movable member after a time interval following said heat source failure, and means for maintaining the time interval between said heat source failure and drop-out within predetermined limits in spite of substantial fluctuations in the line voltage tending to substantially vary the current flow through said load coil and control device and thereby to substantially vary said drop-out time interval, said means comprising an alternating current negative bias winding for said load winding, and an inductance in circuit with said bias winding and said alternating current line, said inductance being cored to afford a non-linear impedance which varies the negative bias of said bias winding in a non-proportional manner in response to fluctuations in line voltage, whereby to maintain the current flow through said load coil and control device within predetermined limits and thereby said drop-out time interval within corresponding limits.

5. Control apparatus comprising, in combination, electroresponsive control means energizable to effect a predetermined control function, a saturable core, a load winding on said core in circuit with said control means and with a source of operating energy, a control winding on said core energizable to permit sufficient current flow from said source to said load winding and control means to effect energization of the latter, means in circuit with said control winding for effecting energization of the latter, and means in circuit with said source and having at least a portion inductively associated with said saturable core for maintaining the current flow through said load winding within predetermined limits in spite of substantial fluctuations in said source of operating energy tending to substantially vary said current flow.

6. Control apparatus comprising, in combination, electroresponsive control means energizable to effect a predetermined control function, a saturable core, a load winding on said core in circuit with said control means and with a source of operating energy, a control winding on said core energizable to permit sufficient current flow from said source to said load winding and control means to effect energization of the latter, means in circuit with said control winding for effecting energization of the latter, and means for maintaining the current flow through said load winding within predetermined limits in spite of substantial fluctuations in said source of operating energy tending to substantially vary said current flow, said means comprising a bias winding on said core and means in circuit with said bias winding and said source to afford a non-linear current flow to said bias winding in a non-proportional manner in response to fluctuations in said source of operating energy.

7. Control apparatus comprising, in combination, electroresponsive control means energizable to effect a predetermined control function, a saturable reactor having a pair of load windings and a control winding wound on a saturable core, a thermoelectric generator in circuit with said control winding and operable to afford energization of the latter, and a unidirectional impedance in circuit with each of said load windings, said load windings being in circuit with said control means and with a source of alternating current, said impedance being arranged to cause said load windings to alternately conduct current from said source to said control means, said load and control windings being so wound on said core that the flux generated by energization of said control winding by current from said generator continuously aids the flux generated by energization of each of said load windings, such conduction of current by said load windings while the control winding is energized causing the core of said reactor to saturate to permit sufficient alternating current energization of said control means to effect said predetermined control function.

8. Control apparatus comprising, in combination, a magnetic core, a pair of load windings on said core connected to an alternating current source, a control winding on said core, rectifier means for causing current from said source to flow to said load windings alternatively during alternate halves of the alternating current cycle, a control device connected in circuit with said load windings and adapted to be energized by current from said alternating current source flowing through said load windings, said device having a control member actuable to controlling positions, means including a source of small direct electric current connected in circuit with said control winding for energizing the latter, said load and control windings being so wound on said core that the flux generated by energization of said control winding by said small direct current continuously aids the flux generated by energization of each of said load windings, energization of said control winding effecting saturation of said core to permit sufficient current from said alternating current source to flow through said load windings and control device for actuation of said control member, condition responsive circuit controlling means in circuit with said control device and operable to permit or prevent actuation of said control member by said sufficient current flow in response to the presence or absence of a given condition, response of said condition responsive means to said given condition during energization of said control winding by said source of small direct electric current effecting actuation of said control member to controlling positions, failure of said small direct current source rendering said core unsaturated to prevent flow from said alternating current source through said load windings and control device of current of a magnitude sufficient to actuate said control member.

9. Control apparatus comprising, in combination, electroresponsive control device having a control member movable to controlling positions, energizing means for said control device including a self-saturating reactor having a control winding and a pair of load windings in circuit with said control device, and a thermoelectric generator in circuit with said control winding for energization thereof in response to heating of said generator, energization of said control winding by said generator permitting sufficient current from said alternating current source to flow through said load windings and control device to effect saturation of said reactor and response of said electroresponsive control device, deenergization of control winding rendering said reactor unsaturated to prevent said sufficient current flow, and condition responsive circuit controlling means in circuit with said control device and operable to permit or prevent actuation of said control member by said sufficient current flow in accordance with the presence or absence of a predetermined condition, wherefore said controlling movement of said control member can be effected only during simultaneous occurrence of said predetermined condition and heating of said generator.

10. Control apparatus comprising, in combination, electroresponsive control device having a control member movable to controlling positions, condition responsive means in circuit with said control device for controlling movement of said control member in response to changes in a given condition, energizing means for said control device including a source of alternating current and a saturable reactor having a control winding and a pair of load windings in circuit with said control device and said source, a unidirectional impedance in circuit with each of said load windings and with said control device and said source, said impedance being so arranged with respect to said load windings that the latter are respectively permitted to conduct current for energization of said control device only during alternate halves of the alternating current cycle, and a thermoelectric generator in circuit with said control winding for energization thereof in response to heating of said generator, said load and control windings being so wound that the flux generated by energization of said control winding by current from said generator continuously aids the flux generated by energization of each of said load windings, energization of said control winding by said generator permitting sufficient current from said alternating current source to flow through said load windings and control device to effect saturation of said reactor and response of said electroresponsive control device, said reactor being rendered unsaturated to prevent such current flow from said alternating current source upon deenergization of said control winding, wherefore said controlling movement of said control member can be effected only during simultaneous occurrence of said predetermined condition and heating of said generator.

11. Control apparatus comprising in combination, a magnetic core, a load winding on said core connected to an alternating current source, unidirectional impedance means in circuit with said winding and with said source and affording a low impedance circuit between said source and said load winding during alternate halves of the alternating current cycle, a control winding on said core operable when energized by a small direct electric current to generate flux substantially saturating said core and thereby permitting current from said source to flow through said load winding during alternate halves of the alternating current cycle, and alternating current means for permitting an increase in the voltage of said alternating current source to effect a substantial increase in the current flowing through said load winding when the control winding is energized, without a corresponding increase in said current flow when said control winding is deenergized, said means comprising a bias winding on said core, said bias winding being connected in circuit with said alternating current source and wound on said core in such a manner that during the half cycle that said load winding is deenergized, flow of alternating current through the bias winding generates a flux flow in the direction opposite to the direction of the flux flow generated by said load winding when the latter is energized.

12. Control apparatus comprising in combination, a control device having a member movable between a pulled-in position toward which it is moved on energization of said device by current of a given pull-in value and a dropped-out position toward which it is moved by a drop in said energizing current to a given drop-out value, a magnetic core, a load winding on said core connected in circuit with said control device and with an alternating current source, unidirectional impedance means in circuit with said winding and with said source and affording a low impedance circuit between said source and said load winding during alternate halves of the alternating current cycle, a control winding on said core operable when energized by a small direct current to generate flux substantially saturating said core and thereby permitting current from said source to flow through said load winding and said control device during alternate halves of the alternating current cycle for pull-in of said movable member, deenergization of said control winding effecting a substantial reduction in said current flow for drop-out of said movable member, and alternating current means for permitting an increase in the voltage of said alternating current source to effect a substantial increase in the current flowing through said load winding to said control device when the control winding is energized, without a corresponding increase in said current flow when said control winding is deenergized, said means comprising a bias winding on said core, said bias winding being connected in circuit with said alternating current source and wound on said core in such a manner that during the half cycle that said load winding is deenergized, flow of alternating current through the bias winding generates a flux flow in the direction opposite to the direction of the flux flow generated by said load winding when the latter is energized, said alternating current means permitting the use in said apparatus, for control in response to the presence or absence of said small direct current in said control winding, of a control device having higher pull-in current characteristics without correspondingly higher drop-out current characteristics.

13. Control apparatus comprising in combination, a magnetic core, a pair of load windings on said core connected to an alternating current source, unidirectional impedance means in circuit with each of said windings and with said source and affording a low impedance circuit between said source and said load windings alternatively during alternate halves of the alternating current cycle, a control winding on said core operable when energized by a small direct electric current to generate flux substantially saturating said core and thereby permitting current from said source to flow through said load windings alternatively during alternate halves of the alternating current cycle, and alternating current means for permitting an increase in the voltage of said alternating current source to effect a substantial increase in the current flowing through said load windings when the control winding is energized, without a corresponding increase in said current flow when said control winding is deenergized, said means comprising a bias winding on said core for each of said load windings, said bias windings each being connected in circuit with said alternating current source and wound on said core in such a manner that during the half cycle that a given load winding is deenergized flow of alternating current through the corresponding bias winding generates a flux flow in the direction opposite to the direction of the flux flow generated by said load winding when the latter is energized.

14. Control apparatus comprising in combination, a control device having a member movable between a pulled-in position toward which it is moved on energization of said device by current of a given pull-in value and a dropped-out position toward which it is moved by a drop in said energizing current to a given drop-out value, a magnetic core, a pair of load windings on said core connected to an alternating current source, unidirectional impedance means in circuit with each of said windings and with said source and affording a low impedance circuit between said source and said load windings alternatively during alternate halves of the alternating current cycle, a control winding on said core operable when energized by a small direct electric current to generate flux substantially saturating said core and thereby permitting current from said source to flow through said control device and alternatively through said load windings during alternate halves of the alternating current cycle for pull-in of said movable member, deenergization of said control winding effecting a substantial reduction in said current flow for drop-out of said movable member, and alternating current means for permitting an increase in the voltage of said alternating current source to effect a substantial increase in the current flowing through said control device and load windings when the control winding is energized, without a corresponding increase in said current flow when said control winding is deenergized, said means comprising a bias winding on said core for each of said load windings, said bias windings each being connected in circuit with said alternating current source and wound on said core in such a manner that during the half cycle that a given load winding is deenergized flow of alternating current through the corresponding bias winding generates a flux flow in the direction opposite to the direction of the flux flow generated by said load winding when the latter is energized, said alternating current means permitting the use in said appaartus, for control in response to the presence or absence of said small direct current in said control winding, of a control device having higher pull-in current characteristics without correspondingly higher drop-out current characteristics.

References Cited in the file of this patent
UNITED STATES PATENTS

| | | |
|---|---|---|
| 1,979,127 | Warrick | Oct. 30, 1934 |
| 2,201,328 | Wallis et al. | May 21, 1940 |
| 2,306,578 | Wetzel | Dec. 29, 1942 |
| 2,512,317 | Edwards et al. | June 20, 1950 |
| 2,529,450 | Hornfeck | Nov. 7, 1950 |
| 2,684,115 | Cairns | July 20, 1954 |